(12) United States Patent
Cline et al.

(10) Patent No.: US 8,958,673 B2
(45) Date of Patent: Feb. 17, 2015

(54) MOLDED FIBER OPTIC CABLE FURCATION ASSEMBLIES, AND RELATED FIBER OPTIC COMPONENTS, ASSEMBLIES, AND METHODS

(75) Inventors: Timothy S. Cline, Granite Falls, NC (US); Terry L. Cooke, Hickory, NC (US); Tory A. Klavuhn, Newton, NC (US); Mario L. Tooley, Statesville, NC (US)

(73) Assignee: Corning Cable Systems LLC, Hickory, NC (US)

( * ) Notice: Subject to any disclaimer, the term of this patent is extended or adjusted under 35 U.S.C. 154(b) by 325 days.

(21) Appl. No.: 13/161,976

(22) Filed: Jun. 16, 2011

(65) Prior Publication Data

US 2012/0301090 A1 Nov. 29, 2012

Related U.S. Application Data

(60) Provisional application No. 61/490,771, filed on May 27, 2011.

(51) Int. Cl.
*G02B 6/44* (2006.01)
*G02B 6/38* (2006.01)

(52) U.S. Cl.
CPC ............ *G02B 6/4471* (2013.01); *G02B 6/3889* (2013.01)
USPC ........... 385/103; 385/100; 385/101; 385/102; 385/104; 385/105

(58) Field of Classification Search
CPC ...... G02B 6/4433; G02B 6/4432; G02B 6/44; G02B 6/36
USPC .................................................. 385/100–106
See application file for complete search history.

(56) References Cited

U.S. PATENT DOCUMENTS

| | | | |
|---|---|---|---|
| 5,231,688 A | 7/1993 | Zimmer | 385/139 |
| 5,473,718 A | 12/1995 | Sommer | 385/87 |
| 5,838,861 A | 11/1998 | Bunde | 385/100 |
| 5,892,871 A | 4/1999 | Dahan et al. | 385/86 |
| 5,903,693 A | 5/1999 | Brown | 385/100 |
| 5,966,489 A | 10/1999 | Harwell et al. | 385/114 |

(Continued)

FOREIGN PATENT DOCUMENTS

DE 3820950 A1 12/1989

OTHER PUBLICATIONS

Patent Cooperation Treaty International Search Report, Application No. PCT/US2012/038956, Aug. 17, 2012, 2 pages.

(Continued)

*Primary Examiner* — Jennifer Doan

(57) ABSTRACT

Molded fiber optic cable furcation assemblies, and related fiber optic components, assemblies, and methods are disclosed. In one embodiment, an end portion of a fiber optic cable with a portion of a cable jacket removed to expose optical fibers and/or a cable strength member(s) therein and thereafter placing the cable into a mold for creating a molded furcation plug about the end portion of the fiber optic cable. The furcation plug may be overmolded about the end portion of the fiber optic cable. The molded furcation plug can be used to pull a fiber optic cable without damaging the optical fiber(s) disposed within the fiber optic cable. The molded furcation plug is advantageous since it manufactured with fewer parts, without epoxy, and/or without a labor intensive process that may be difficult to automate.

22 Claims, 15 Drawing Sheets

(56) References Cited

U.S. PATENT DOCUMENTS

| | | | | |
|---|---|---|---|---|
| 5,970,195 | A | 10/1999 | Brown | 385/100 |
| 6,278,831 | B1 | 8/2001 | Henderson et al. | 385/139 |
| 6,389,214 | B1 | 5/2002 | Smith et al. | 385/136 |
| 6,438,299 | B1 | 8/2002 | Brown et al. | 385/100 |
| 6,738,555 | B1 | 5/2004 | Cooke et al. | 385/136 |
| 6,764,221 | B1 | 7/2004 | De Jong et al. | 385/55 |
| 6,771,861 | B2 | 8/2004 | Wagner et al. | 385/100 |
| 6,909,828 | B2 | 6/2005 | Zimmel et al. | 385/100 |
| 6,993,237 | B2 | 1/2006 | Cooke et al. | 385/135 |
| 7,035,510 | B2 | 4/2006 | Zimmel et al. | 385/100 |
| 7,200,316 | B2 | 4/2007 | Giraud et al. | 385/135 |
| 7,270,485 | B1 | 9/2007 | Robinson et al. | 385/55 |
| 7,277,614 | B2 | 10/2007 | Cody et al. | 385/100 |
| 7,280,725 | B2 | 10/2007 | Brown et al. | 385/100 |
| 7,330,629 | B2 | 2/2008 | Cooke et al. | 385/136 |
| 7,461,981 | B2 | 12/2008 | Yow, Jr. et al. | 385/76 |
| 7,492,997 | B2 | 2/2009 | Bell et al. | 385/100 |
| 7,494,284 | B2 | 2/2009 | Robinson et al. | 385/139 |
| 7,512,308 | B2 | 3/2009 | Barnes et al. | 385/139 |
| 7,703,990 | B1 | 4/2010 | De Jong et al. | 385/87 |
| 7,903,925 | B2 | 3/2011 | Cooke et al. | 385/136 |
| 7,945,136 | B2 | 5/2011 | Cooke et al. | 385/135 |
| 7,955,004 | B2 | 6/2011 | DiMarco | 385/99 |
| 2003/0210875 | A1 | 11/2003 | Wagner et al. | 385/100 |
| 2004/0126069 | A1 | 7/2004 | Jong et al. | 385/109 |
| 2005/0002621 | A1 | 1/2005 | Zimmel et al. | 385/100 |
| 2005/0031276 | A1 | 2/2005 | Zimmel et al. | 385/100 |
| 2005/0111810 | A1 | 5/2005 | Giraud et al. | 385/135 |
| 2005/0111811 | A1 | 5/2005 | Cooke et al. | 385/136 |
| 2005/0276551 | A1 | 12/2005 | Brown et al. | 385/100 |
| 2006/0120672 | A1 | 6/2006 | Cody et al. | 385/86 |
| 2007/0047897 | A1 | 3/2007 | Cooke et al. | 385/136 |
| 2008/0013888 | A1 | 1/2008 | Barnes et al. | 385/53 |
| 2008/0138020 | A1 | 6/2008 | Robinson et al. | 385/106 |
| 2008/0138026 | A1 | 6/2008 | Yow et al. | 385/137 |
| 2009/0003782 | A1 | 1/2009 | Bell et al. | 385/114 |
| 2009/0190889 | A1 | 7/2009 | Robinson et al. | 385/110 |
| 2010/0054676 | A1 | 3/2010 | Cooke et al. | 385/100 |
| 2010/0054678 | A1 | 3/2010 | DiMarco | 385/113 |
| 2010/0054684 | A1 | 3/2010 | Cooke et al. | 385/135 |
| 2010/0054686 | A1 | 3/2010 | Cooke et al. | 385/135 |
| 2010/0080524 | A1 | 4/2010 | Ciechomski et al. | 385/135 |
| 2010/0086267 | A1 | 4/2010 | Cooke et al. | 385/100 |
| 2010/0092135 | A1 | 4/2010 | Barker et al. | 385/76 |
| 2010/0098386 | A1 | 4/2010 | Kleeberger | 385/100 |
| 2010/0183270 | A1 | 7/2010 | Davis et al. | 385/100 |
| 2010/0202740 | A1 | 8/2010 | Barlowe et al. | 385/100 |
| 2010/0209059 | A1 | 8/2010 | Conrad et al. | 385/110 |
| 2010/0215330 | A1 | 8/2010 | Sokolowski et al. | 385/136 |
| 2010/0220964 | A1 | 9/2010 | De Jong et al. | 385/100 |
| 2010/0322578 | A1 | 12/2010 | Cooke et al. | 385/135 |
| 2011/0091169 | A1 | 4/2011 | Van Der Meulen et al. | 385/100 |
| 2011/0243514 | A1* | 10/2011 | Nave | 385/110 |

OTHER PUBLICATIONS

European Patent Office Search Report, Application No. 12792605.3-1504/2715418, Oct. 1, 2014, 8 pages.

* cited by examiner

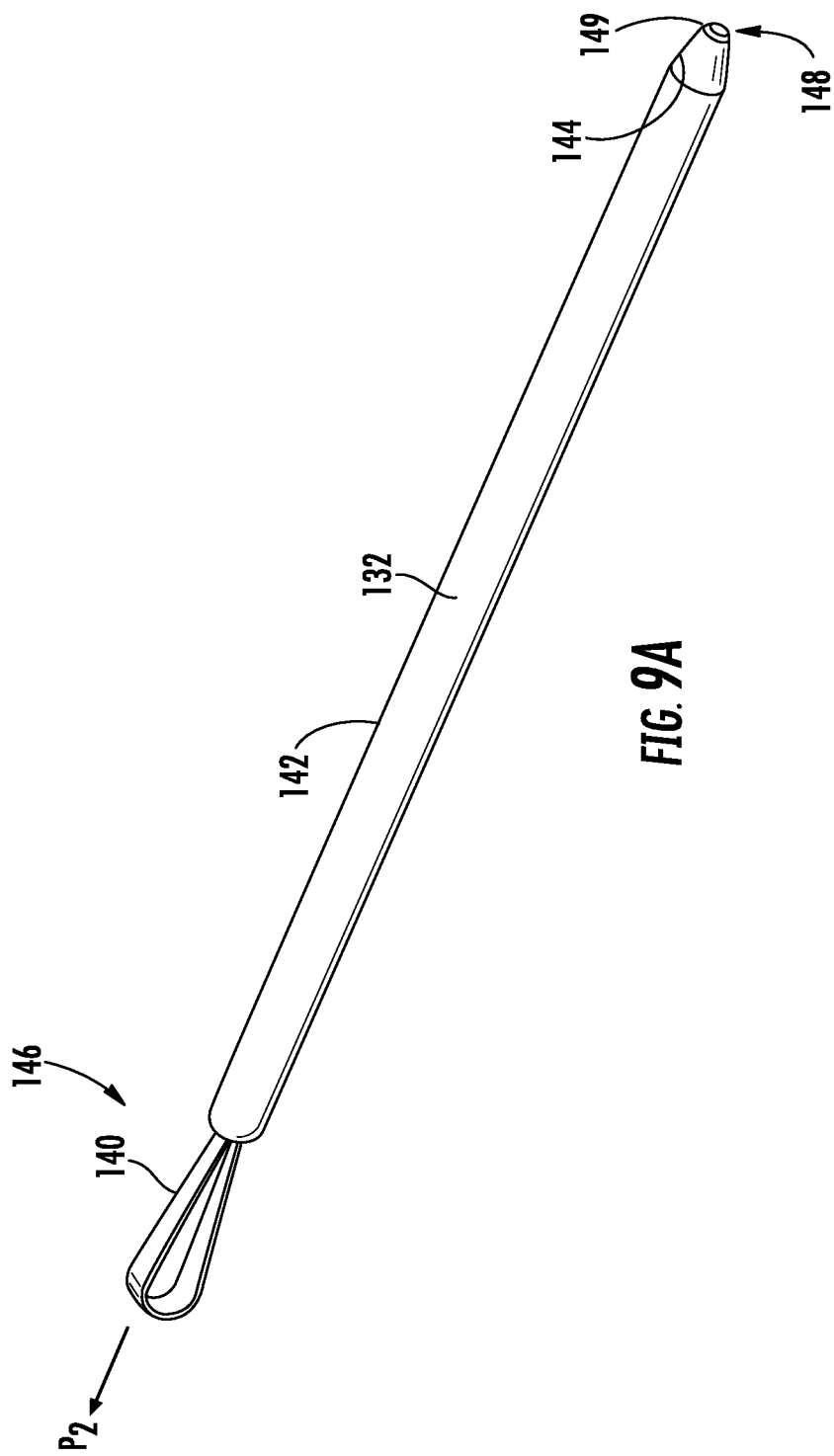

MOLDED FIBER OPTIC CABLE FURCATION ASSEMBLIES, AND RELATED FIBER OPTIC COMPONENTS, ASSEMBLIES, AND METHODS

RELATED APPLICATION

This application claims the benefit of priority under 35 U.S.C. §119 of U.S. Provisional Application No. 61/490,771 filed on May 27, 2011, the content of which is relied upon and incorporated herein by reference in its entirety.

BACKGROUND

1. Field of the Disclosure

The technology of the disclosure relates to fiber optic cable furcation assemblies for fiber optic cables, which may be used in establishing interconnection points in fiber optic communications networks.

2. Technical Background

Benefits of optical fiber use include extremely wide bandwidth and low noise operation. Because of these advantages, optical fiber is increasingly being used for a variety of applications, including but not limited to broadband voice, video, and data transmission. Consequently, optical fiber networks are displacing copper communication networks. However, the installation of optical networks can be more challenging to install and as a result "plug and play" components and systems are generally preferred by the craft. Plug and play systems typically use installation-ready components such as preconnectorized fiber optic cables and the like so that the installation in the field is quick and easy.

As used herein, the term "preconnectorized fiber optic cable" may refers to a communications cable including at least one optical fiber that is terminated to a fiber optic connector, plug, receptacle or the like or otherwise assembled by the manufacturer prior to installing the fiber optic cable at a service location. By way of example, preconnectorized distribution cables permit the optical fibers to be interconnected with optical fibers of other preconnectorized fiber optic cables and/or to connection terminals without removing or opening the jacket of the distribution cable, and thereby exposing the optical fibers to adverse environmental conditions, such as moisture, dirt, or dust.

Use of preconnectorized distribution cables in a fiber optic communications network can present certain challenges. For example, a terminated end of the fiber optic cable often times must be pulled to a desired location during installation, such as to a connection terminal (e.g., a fiber distribution hub (FDH)) or to another distribution cable, through relatively small diameter conduits or passageways. Transferring a tensile load to optical fibers disposed in a fiber optic cable during the pulling (i.e., installation) of a fiber optic cable could damage the optical fibers. Accordingly, a terminated end of the fiber optic cable can be provided within a furcation assembly for transferring pulling load away from optical fibers disposed in the fiber optic cable. Additionally, the furcation plug also typically has a transition from a larger count fiber unit to several smaller-count fiber units for fiber management and connection purposes.

The furcation plug is designed to transfer pulling load away from the optical fibers, such as to the cable jacket and/or a strength member(s) of the fiber optic cable that can withstand the pulling load. The furcation assembly may also include a furcation plug that may be configured to be disposed in a pulling clamp during installation. Conventional furcation assemblies are located near an end portion of a fiber optic cable with a portion of the cable jacket removed to expose optical fibers and/or strength members therein and then disposed through an opening in the furcation plug or furcation body. Thereafter, an epoxy is injected into the conventional furcation plug or furcation body for securing the cable jacket and/or strength members disposed inside the end portion of the fiber optic cable at the furcation plug. Moreover, the optical fibers extend through the furcation plug and can be connectorized as known in the art to make a plug and play assembly.

There are challenges when forming a conventional furcation plug on a fiber optic cable to provide a fiber optic cable furcation assembly. For instance, use of epoxy as a bonding and structural agent to secure optical fibers and/or strength members of the fiber optic cable is labor intensive and can suffer from defects related to epoxy voids created within a furcation plug. Further, manufacturing methods using epoxy within the furcation plug may not easily be automated. Heat shrink or other components that may damage the cable jacket may be required to maintain the epoxy within the furcation plug during assembly. Therefore, there is an unresolved need for fiber optic cable furcation assemblies that solve the problems associated with the prior art furcation assemblies such as manufacturing complexity, cost, defects and the like.

SUMMARY OF THE DETAILED DESCRIPTION

Embodiments disclosed in the detailed description include molded fiber optic cable furcation assemblies, and related fiber optic components, assemblies, and methods. In one embodiment, an end portion of a fiber optic cable with a portion of a cable jacket removed to expose optical fibers and/or a strength member(s) therein can be disposed in a mold to create a molded furcation plug about the end portion of the fiber optic cable. The molded furcation plug may be overmolded about the end portion of the fiber optic cable. The molded furcation plug can be used to pull a fiber optic cable without damaging the optical fiber(s) disposed within the fiber optic cable. The molded furcation plug is advantageous since it may be manufactured with fewer parts, without epoxy, and/or without a labor intensive process that may be difficult to automate.

In this regard in one embodiment, a method of preparing a fiber optic cable furcation assembly is provided. This method includes providing a fiber optic cable. This method also includes removing a portion of a cable jacket from an end portion of a fiber optic cable to form a transition interface exposing end portions of one or more optical fibers and one or more strength members from the cable jacket, thereby forming a transition area. In one embodiment, the transition area may comprise the transition interface, a portion of the cable jacket located a first distance from the transition interface, and a portion of the end portions of one or more optical fibers and strength members located a second distance from the transition interface. This method also includes molding, within a first mold, a furcation plug upon the transition area of the fiber optic cable.

In another embodiment, a fiber optic cable assembly is provided. This fiber optic cable assembly may comprise a fiber optic cable including one or more optical fibers and one or more strength members disposed in a cable jacket. This assembly also includes end portions of the one or more optical fibers and end portions of the one or more strength members that may both be exposed from an end portion of the cable jacket at a transition interface to form a transition area in an end portion of the fiber optic cable. Further, this assembly also includes a furcation plug that may be molded upon the transition area of the end portion of the fiber optic cable.

In a further embodiment, a fiber optic pulling assembly is provided. This fiber optic pulling assembly may include one or more optical fibers and one or more strength members disposed within a cable jacket. Also, end portions of the one or more optical fibers and end portions of the one or more strength members may both be exposed from an end portion of the cable jacket at a transition interface to form a transition area in an end portion of the fiber optic cable. The fiber optic pulling assembly also may comprise a furcation assembly including a furcation plug molded upon the transition area of the end portion of the fiber optic cable having one or more pulling surfaces. The fiber optic pulling assembly may also include a pulling clamp disposed around the furcation plug and in communication with one or more pulling surfaces of the furcation plug.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 9A illustrates a pulling bag for receiving the pulling device of FIG. 8B and the molded fiber optic cable furcation assembly of FIG. 8B therein for pulling the fiber optic cable during installation;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include molded fiber optic cable furcation assemblies, and related fiber optic components, assemblies, and methods. In one embodiment, an end portion of a fiber optic cable with a portion of a cable jacket removed to expose optical fibers and/or a strength member(s) therein can be disposed in a mold to create a molded furcation plug about the end portion of the fiber optic cable. The molded furcation plug may be overmolded about the end portion of the fiber optic cable. The molded furcation plug can be used to pull a fiber optic cable without damaging the optical fiber(s) disposed within the fiber optic cable along with providing a furcation for the optical fibers. The molded furcation plug may be manufactured with fewer parts, without epoxy, and/or without a labor intensive process that may be difficult to automate.

Figure 1A:
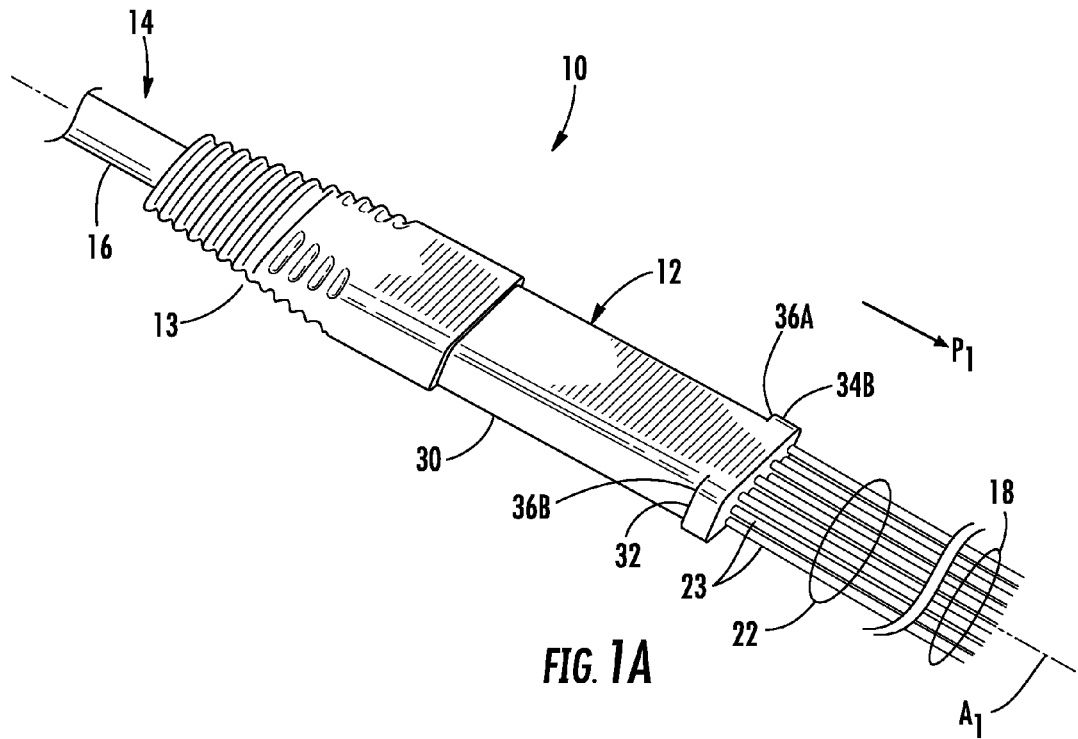
FIG. 1A is a schematic diagram of an exemplary molded fiber optic cable furcation assembly disposed on an end portion of a fiber optic cable, the fiber optic cable furcation assembly comprised of an integral furcation plug and strain relief device molded upon the end portion of the fiber optic cable.
Figure 1B:
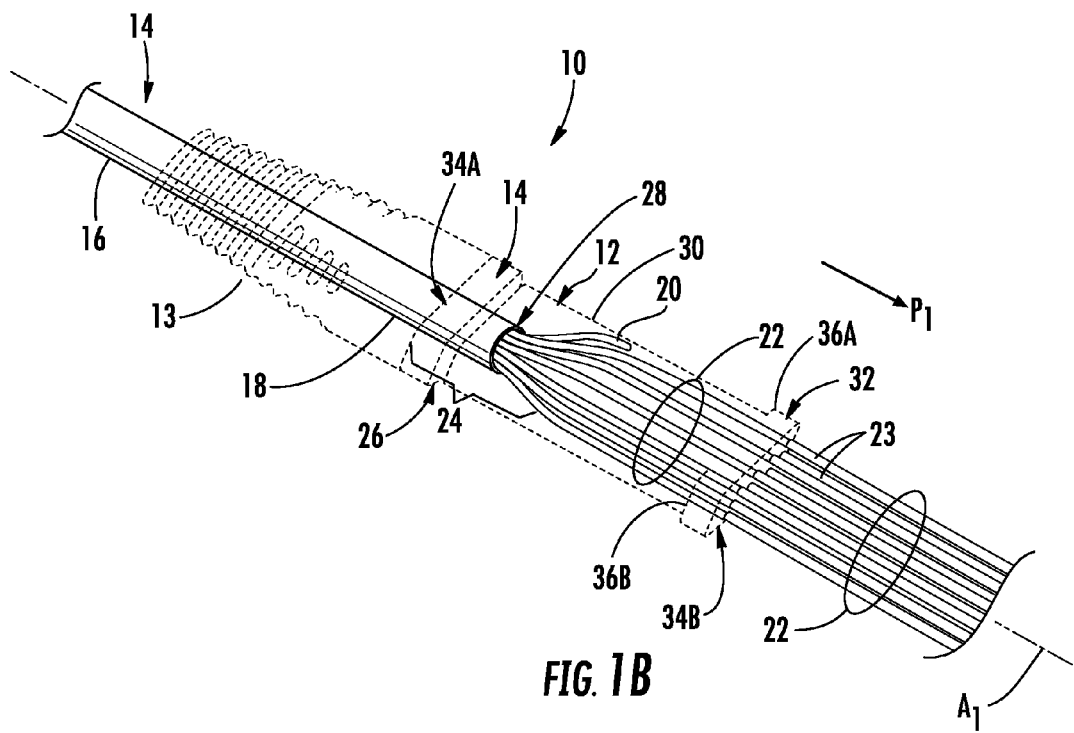
FIG. 1B is a schematic diagram of the furcation assembly of FIG. 1A depicting optical fibers and strength members disposed within the furcation plug.

In this regard, FIG. 1A illustrates a schematic diagram of one embodiment of a fiber optic cable furcation assembly 10 (referred to herein as "furcation assembly 10"). The furcation assembly 10 in this embodiment is comprised of a molded furcation plug 12 and optional strain relief device 13 disposed upon a fiber optic cable 14. FIG. 1B illustrates the furcation assembly 10 in FIG. 1A, but with the molded furcation plug 12 and strain relief device 13 shown in hidden lines so that the fiber optic cable 14 and preparations disposed inside the molded furcation plug 12 can been seen. The fiber optic cable 14 is comprised of a cable jacket 16 with a plurality of optical fibers 18 and one or more cable strength members 20 disposed therein. As a non-limiting example, the cable strength members 20 may be provided as one or more tensile yarns. As another non-limiting example, the cable strength members 20 may be manufactured from aramid, such as Kevlar®. Other examples of materials that may be employed for the cable strength members 20 include, but are not limited to para-aramid fibers such as the Twaron® brand manufactured by Teijin Aramid, or thermoplastic polyester elastomer materials such as the Heraflex® brand manufactured by Radici Partecipazioni S.p.A.

With continuing reference to FIGS. 1A and 1B, and as will be discussed in more detail below, the optical fibers 18 are disposed in one or more optical fiber sub-units 22 disposed longitudinally within the cable jacket 16. More specifically, the optical fibers 18 are disposed in sub-unit jackets 23 of the optical fiber sub-units 22. Any suitable number of optical fiber sub-units 22 may be provided. Likewise, any suitable number of optical fibers 18 may be disposed within each of the optical fiber sub-units 22. In this embodiment, the optical fibers are disposed within the sub-unit jacket within the furcation plug. However, the optical fibers 18 can have any suitable construction or covering as they pass through the furcation plug such as buffered fibers, bare fibers, or suitable other construction. As illustrated in FIG. 1B, a portion of the cable jacket 16 can be cut or otherwise removed to expose the optical fiber sub-units 22 from the cable jacket 16 to provide furcated legs for establishing fiber optic connections with the optical fibers 18. In other words, the sub-units pass through the furcation plug and provide furcated legs of optical fibers as the sub-units transition out of the furcation plug. The ends of the optical fibers 18 can be connectorized with fiber optic connectors (e.g., without limitation, LC, FC, ST, SC, MTP style connectors), if desired, to allow fiber optic connections.

In this embodiment, the molded furcation plug 12 is molded on or about a transition area 24 in an end portion 26 of the fiber optic cable 14, as illustrated in FIG. 1B. As will be discussed in more detail below with regard to FIG. 3C, the transition area 24 in the end portion 26 of the fiber optic cable 14 in this embodiment is comprised of an end portion of the cable jacket 16 adjacent a transition interface 28, and a portion of the optical fiber sub-units 22 and cable strength member 20 adjacent to and on the opposite side of the transition interface 24 from the cable jacket 16. The optional strain relief device 13 is also illustrated in FIGS. 1A and 1B as being disposed on or about the cable jacket 16 adjacent to the molded furcation plug 12. In the embodiment of the furcation assembly 10, the strain relief device 13 is integrally molded with the molded furcation plug 12 from a single mold cavity. The strain relief device 13 is designed to prevent or resist excess bending of the cable jacket 16 adjacent to the molded furcation plug 12 beyond the bend rating of the fiber optic cable 14. This may prevent or avoid damage to the optical fibers 18 and/or avoid unacceptable optical attenuation in the optical fibers 18. The strain relief device 13 may be provided as a separate component from the molded furcation body 30, and may be formed or provided prior to being disposed on the fiber optic cable 14.

The molded furcation plug 12 in FIGS. 1A and 1B may provide several benefits. As one non-limiting example, the molded furcation plug 12 may secure the cable jacket 16 and the cable strength member(s) 20 disposed in the fiber optic cable 14 in a manner that may direct a pulling load $P_1$ to the cable jacket 16 and/or the cable strength members 20 and away from the optical fibers 18 to avoid damaging the optical fibers 18. As another non-limiting example, the molded furcation plug 12 may provide a structure that may be secured in a fiber optic cable environment, such as a chassis, to secure the fiber optic cable 14 and thereby allow the optical fiber sub-unit 22 to be connected to the other fiber optic connectors, adapters, and/or equipment. Stated another way, the furcation plug may have structure or geometry to aid in mounting and/or securing the plug within a clip or directly to a mounting structure. As will also be discussed in more detail below, by molding of the furcation plug, it may be manufactured with fewer parts, without epoxy, and/or without a labor intensive process that may be difficult to automate.

With continuing reference to FIGS. 1A and 1B, the molded furcation plug 12 may be molded to provide a molded furcation body 30 that includes a shoulder 32 disposed on first and second ends 34A, 34B of the molded furcation body 30. The shoulder 32 provides a surface for pulling the molded furcation body 30 to in turn pull the fiber optic cable 14. As will be described in more detail below, the shoulder 32 may be molded in a geometry that is complementary to a geometry of a pulling device for imposing a pulling load on the molded furcation plug 12 for pulling the fiber optic cable 14. The shoulder 32 may have pulling surfaces 36A, 36B disposed generally orthogonal to a longitudinal axis $A_1$ of the molded furcation plug 12 to transfer the pulling load $P_1$ to the molded furcation body 30 and in turn to the cable jacket 16 and/or the cable strength member(s) 20.

Figure 2:
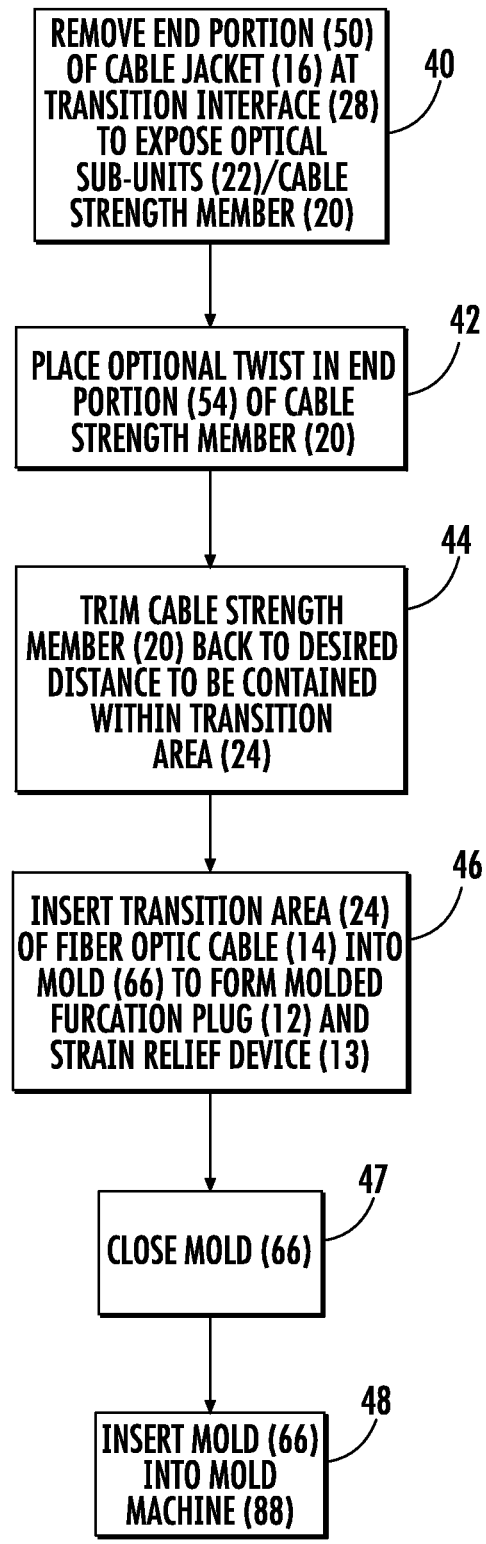
FIG. 2 is a flowchart diagram illustrating an explanatory process that may form a molded fiber optic cable furcation assembly using an overmolding process with a single mold cavity to produce both the furcation plug and strain relief device as depicted in FIG. 1A.
Figure 3A:
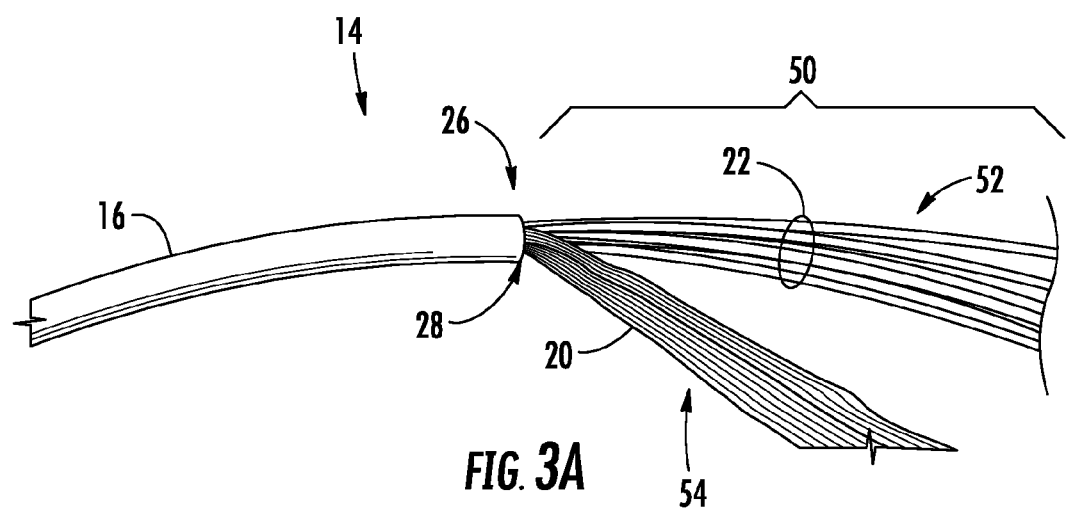
FIG. 3A illustrates an end portion of the fiber optic cable in FIG. 1A prior to overmolding and cut to a desired length with a portion of a cable jacket removed at a transition interface to expose end portions of optical fibers ("optical fiber end portions") and end portions of strength members ("strength member end portions") disposed inside the cable jacket to form a transition area in the fiber optic cable.

FIG. 2 provides a flowchart representation of an explanatory process for molding the molded furcation plug 12 and the strain relief device 13 as integrated using a single mold, as shown in FIGS. 1A and 1B. The process in FIG. 2 will be described in conjunction with FIGS. 3A-4 As shown in FIG. 3A, an end portion 50 of the cable jacket 16 is removed to prepare the fiber optic cable 14 for molding (block 40 in FIG. 2). As a result, the transition interface 28 is provided between the remaining end of the cable jacket 16 and the optical fiber sub-units 22 and cable strength members 20. For example, a technician may perform this removal. For example, the end portion 50 of the cable jacket 16 may be removed by stripping away the end portion 50 of the cable jacket 16 with a stripping or cutting apparatus. As a result of removing the end portion 50 of the cable jacket 16, end portions 52 of the optical fiber sub-units 22 and end portions 54 of the cable strength members 20 are exposed. Simply stated, the step of removing a portion of the cable jacket leaves a protective layer on the end portions of one or more optical fibers for the step of molding, thereby providing organization in the furcation and protection for the furcated optical fibers; however, different constructions about the optical fibers are possible according to the concepts disclosed herein. The optical fiber sub-units 22 are exposed to provide furcation legs that will extend from the molded furcation plug 12, as illustrated in FIGS. 1A and 1B. The cable strength members 20 are also exposed so that the molded furcation plug 12 can be secured to the cable strength members 20 to direct pulling force applied to the molded furcation plug 12 to the cable strength members 20. The optical fibers 18 disposed within the optical fiber sub-units 22 are not exposed in this embodiment prior to molding the molded furcation plug 12, but could be removed prior to molding if desired.

Figure 3B:
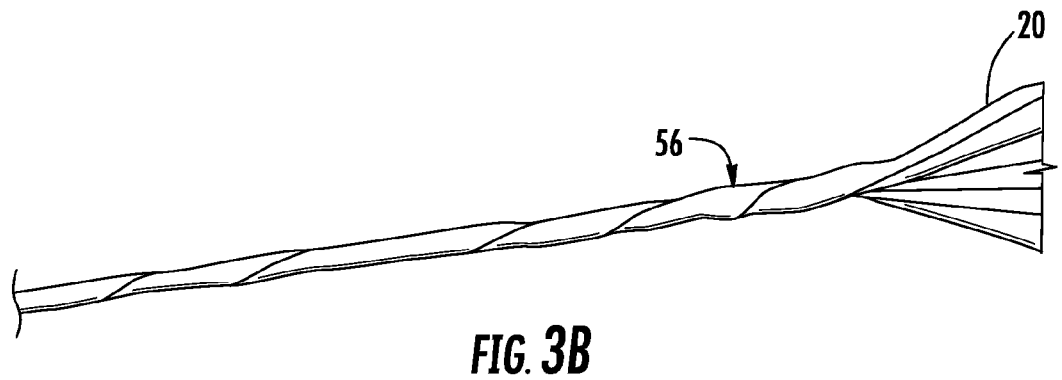
FIG. 3B illustrates the exposed strength member end portions in FIG. 3A twisted.

After the end portion 50 of the cable jacket 16 is removed to expose end portions 52 of the optical fiber sub-units 22 and end portions 54 of the cable strength members 20, preparations for molding the molded furcation plug 12 and the strain relief device 13 can be made. Before molding is performed, an optional twisting of the cable strength members 20 may be performed, as illustrated in FIG. 3B, to dispose twists 56 in the cable strength member 20 to provide additional tensile strength in the cable strength member 20 (block 42 in FIG. 2). To retain the twist 56 in the end portion 54 of the cable strength member 20, tape 58 or other securing means may be disposed around an end 59 of the cable strength member 20, as illustrated in FIG. 3C.

The fiber optic cable 14 is now prepared for molding the molded furcation plug 12 about the transition interface 28 to provide the furcation assembly 10. As illustrated in FIG. 3C, as a result of the removing of the end portion 50 of the cable jacket 16 (block 40 in FIG. 2), the transition interface 28 between the remaining cable jacket 16 and the exposed optical fiber sub-units 22 and cable strength members 20 is provided. The transition interface 28 defines a portion of the transition area 24 that is the area that the molded furcation plug 12 will be molded about the fiber optic cable 14. With continuing reference to FIG. 3C, the transition area 24 comprises an end portion 60 of the cable jacket 16 adjacent to the transition interface 28 of distance $D_1$ and end portions 62, 64 of the exposed optical fiber sub-units 22 and cable strength members 20, respectively, of distance $D_2$ also adjacent to the transition interface 28. The end portions 62, 64 of the exposed optical fiber sub-units 22 and cable strength members 20 are disposed on an opposite side of the transition interface 28 from the end portion 60 of the cable jacket 16.

Figure 3C:
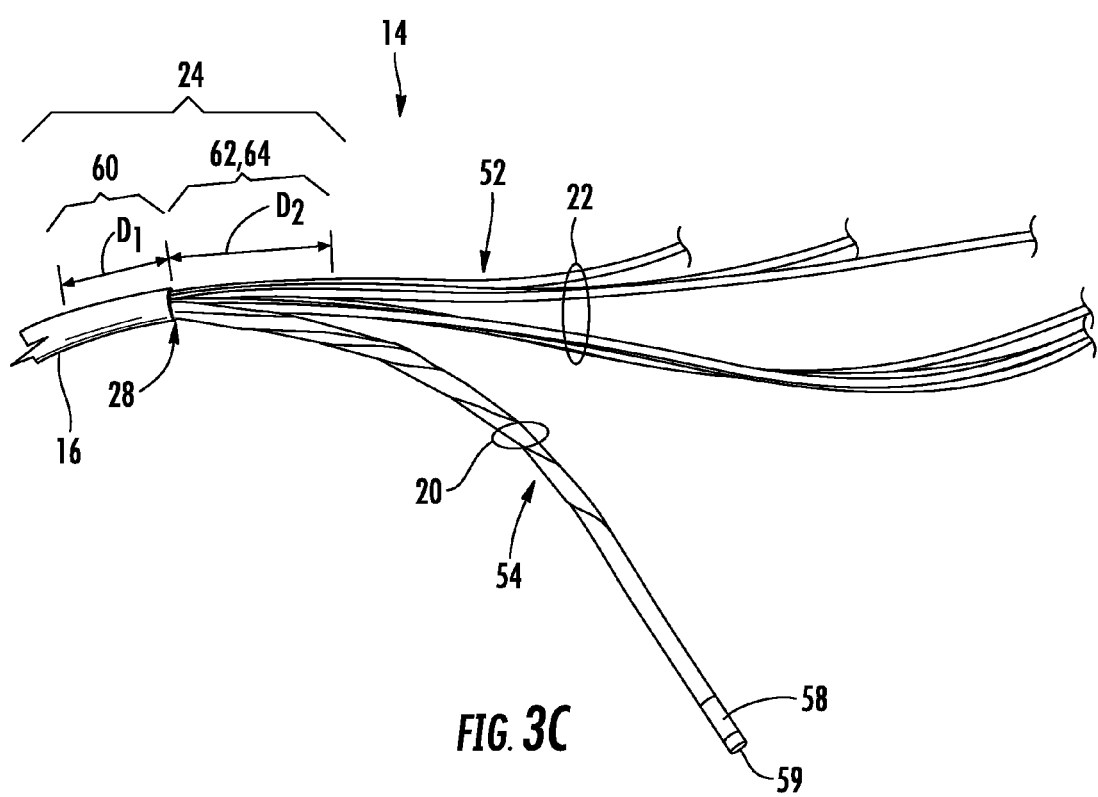
FIG. 3C illustrates the strength member end portion and the optical fiber end portions of the fiber optic cable in FIG. 3A, prior to overmolding a transition area of the fiber optic cable in a mold.

With continuing reference to FIG. 3C, the end portion 50 of the cable jacket 16 may be removed (block 40 in FIG. 2) in any amount desired to provide the desired distances $D_1$, $D_2$ to be compatible with a mold for molding the molded furcation plug 12 and/or the strain relief device 13 about the fiber optic cable 14. The distances $D_1$, $D_2$ may be set to provide the desired amount of the end portion 60 of the cable jacket 16 and the end portions 62, 64 of the optical sub-units 22 and the cable strength member 20 to be secured within the molded furcation plug 12 to transfer pulling forces to the cable jacket 16 and the cable strength member 20, as desired. By way of explanatory example, the distances $D_1$, $D_2$ may be 0.75 inches and 1.25 inches, respectively, as non-limiting examples. As illustrated in FIG. 1B, the end portion 54 of the cable strength members 20 is trimmed back after being exposed from the cable jacket 16 to be exposed within the transition area 26 (block 44 in FIG. 2) so that the cable strength member 20 does not extend outside of the molded furcation body 30 with the optical fiber sub-units 22.

Figure 4:
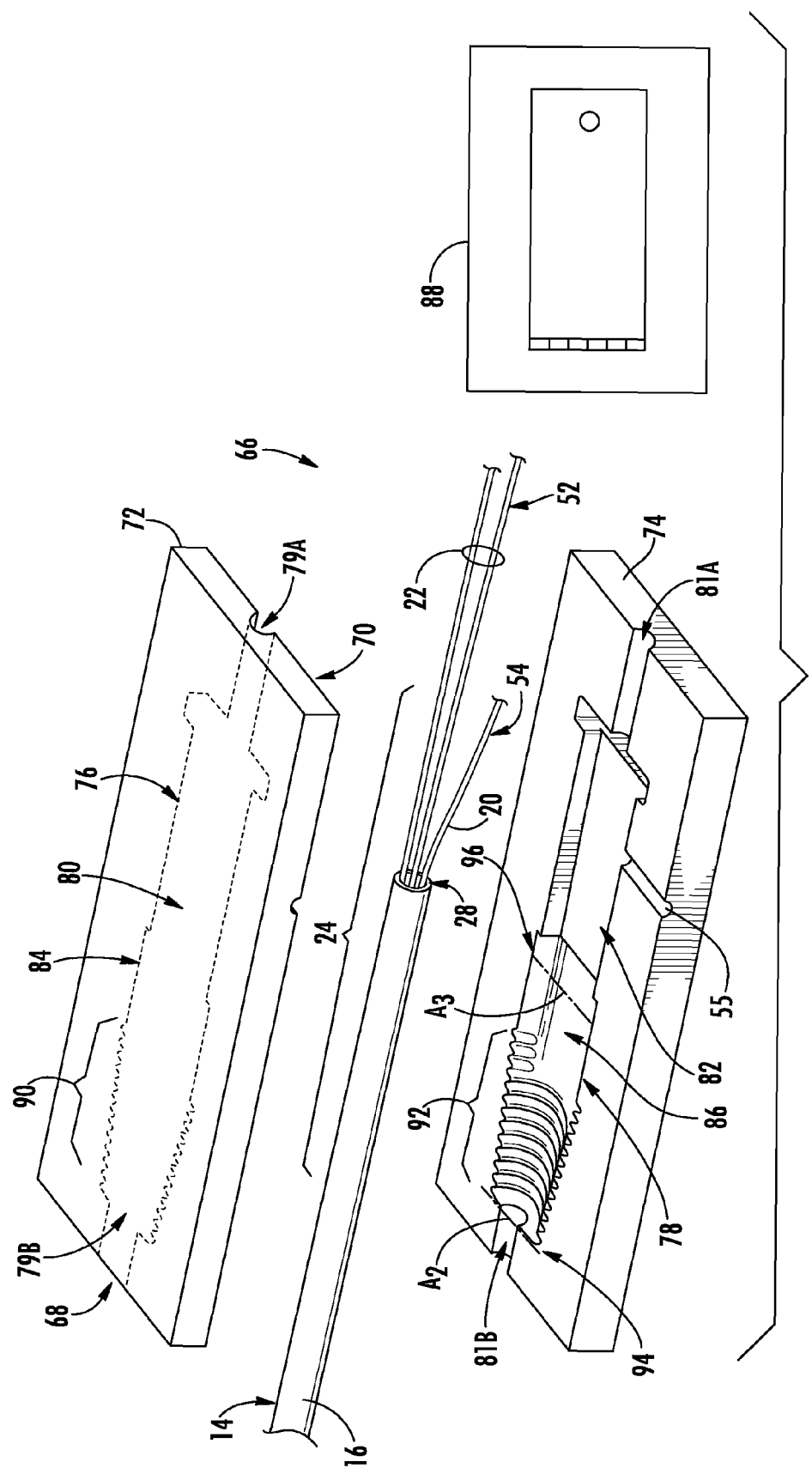
FIG. 4 illustrates the transition area of the fiber optic cable in FIG. 3C disposed in a molding machine configured to accept the cable and create the molded furcation plug upon a transition area.

Once the transition area 24 has been defined and the cable strength members 20 trimmed, the molded furcation plug 12 may be formed. The transition area 24 of the fiber optic cable 14 comprised of the end portions 52, 54 of the optical fiber sub-units 22 and the cable strength members 20 can now be disposed in a mold cavity to produce the molded furcation plug 12 and/or the strain relief device 13 (block 46 in FIG. 2). In this regard, FIG. 4 illustrates a depiction of the transition area 24 of the fiber optic cable 14 disposed within a mold 66 to form the molded furcation plug 12 and the integrated strain relief device 13 about the transition area 24 to be formed upon the fiber optic cable 14. As a non-limiting example, the mold 66 may be a platen mold, but other suitable molds are possible. As illustrated in FIG. 4, the mold 66 is designed such that the transition area 24 is disposed inside the mold 66 with the fiber optic cable 14 extending from a first end 68 of the mold 66 through an orifice formed from half channel 79B and half channel 81B and the end portions 52 of the optical fiber sub-units 22 extending from a second end 70 of the mold 66 through an orifice formed from half channel 79A and half channel 81A.

With continuing reference to FIG. 4, the mold 66 is comprised of a first cover 72 and a second cover 74. Cavities 76, 78 are disposed inside the first cover 72 and the second cover 74, respectively. When the first cover 72 and the second cover 74 are brought together and secured together, the cavities 76, 78 form a closed geometry that provides the shape of the molded furcation body 12 and the strain relief device 13 after the molding process. The cavities 76, 78 in this embodiment are comprised of first sub-cavities 80, 82 to form the molded furcation plug 12 and second sub-cavities 84, 86 to form the strain relief device 13.

To mold the molded furcation plug 12 and strain relief device 13, the first cover 72 and the second cover 74 of the mold 66 are brought together and secured to each other to close the mold 66 with the transition area 24 of the fiber optic cable 14 disposed therein (block 47, FIG. 2). The mold 66 with the transition area 24 secured therein may then be disposed in a molding machine 88 where the cavities 76, 78 are filled with a mold material of specified temperature and pressed through a channel 55 for a controlled time to produce the molded furcation plug 12 (block 48, FIG. 2). Because of the molding process, no epoxy may be required to be disposed inside the molded furcation plug 12 to secure the transition area 24 inside the molded furcation plug 12. Thus, no sealing devices or members, such as heat shrink tube for example, are required to be disposed on an end of the molded furcation plug 12 to prevent an epoxy from escaping from inside the molded furcation plug 12. Non-limiting examples of molding materials include, but are not limited to polymers, including thermoplastics, including polyurethane, or polyamid materials such as those manufactured by Henkel Corporation under the Macromelt® brand, for example. As one non-limiting example, the molding time may be from forty-five (45) to sixty (60) seconds, from eighty (80) to one hundred seventy (170) degrees Fahrenheit, and from fifty (50) to one hundred fifty (150) pounds per square inch (psi) pressure.

Molding a furcation plug upon a fiber optic cable has many non-limiting benefits. As one example, an overmolding process removes the need to use epoxy and heat shrinks, or other securing devices, to attach a furcation plug to a fiber optic cable. In the various embodiments of this disclosure, epoxy does not substantially contribute to the attachment of a furcation plug to a fiber optic cable. One advantage of not using epoxy to secure a furcation plug to a fiber optic cable is that epoxy creates voids that may allow the optical fibers to bend and thus degrade signal quality due to optical attenuation. The overmolding process in FIG. 2 may also be automated in a manufacturing facility resulting in time savings over conventional manufacturing process that require epoxy.

The integrated strain relief device 13 depicted in FIGS. 1A and 1B and molded in the mold 66 may be molded from the same molding material as the molded furcation plug 12. With reference back to FIGS. 1A and 1B, the strain relief device 13 extends from the first end 34A of the molded furcation plug 12 opposite from the second end 34B where the optical fiber sub-units 22 extend from outside of the molded furcation body 30. The fiber optic cable 14 may experience bending forces during installation and movement that may cause strain in the fiber optic cable 14. Thus, the strain relief device 13 may relieve the strain on the fiber optic cable 14 by providing a level of flexibility to resist the bending forces and thereby relieve the strain. The level of flexibility of the strain relief device 13 is controlled by tapered cross-section areas 90, 92 disposed in the second sub-cavities 84, 86, as illustrated in FIG. 4. As illustrated therein, a cross-section area $A_2$ on a first end 94 of the second sub-cavity 86 is smaller than a cross-section area $A_3$ on a second end 96 of the second sub-cavity 86. The level of flexibility may be measured by the spring force constant of the various cross-section areas 90, 92, which may be controlled by the amount of material allowed in the second sub-cavities 84, 86 and thus are able to provide larger restoring forces to relieve cable strain when the fiber optic cable 14 is bent. Other embodiments of the strain relief devices molded on the cable jacket 14 may also have variances in cross-section area to control bend resistance.

Figure 5:
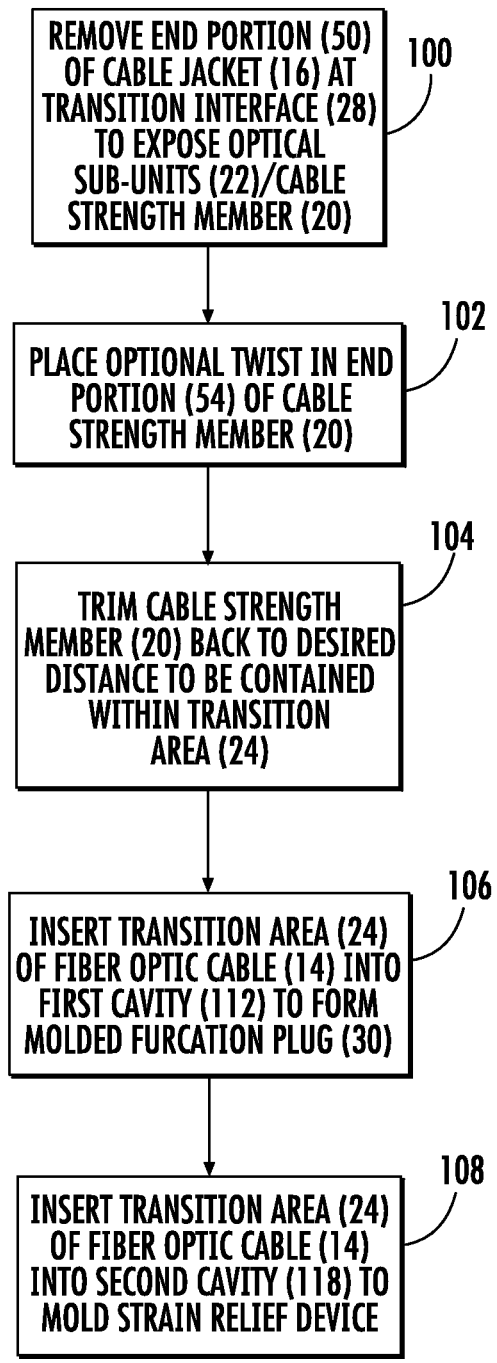
FIG. 5 is a flowchart diagram illustrating an exemplary process that may be employed to manufacture a molded fiber optic cable furcation assembly using an overmolding process with a multi-cavity mold to produce the furcation plug in a first mold cavity and the strain relief device in a second mold cavity.
Figure 6:
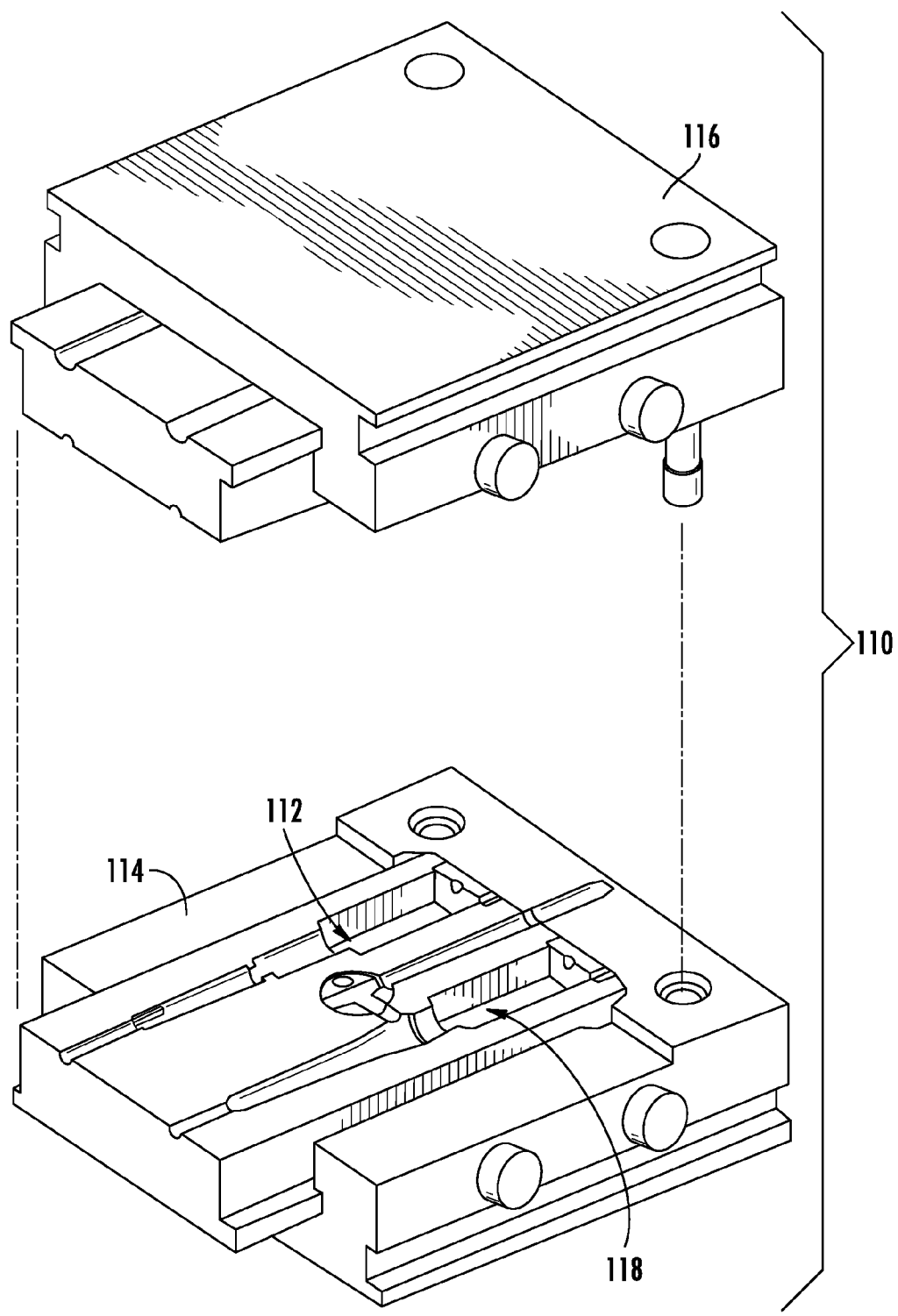
FIG. 6 illustrates a multi-cavity mold adapted to create the molded furcation plug upon the transition area of the fiber optic cable in the first cavity and the strain relief device upon the molded furcation plug in the second cavity using an overmolding process.

FIG. 5 depicts an alternative exemplary process for preparing a molded furcation plug and strain relief device on the fiber optic cable 14 in FIGS. 1A and 1B. In this embodiment as illustrated in FIG. 6, a multi-cavity mold 110 is employed. With reference to FIG. 5, blocks 100-104 may be performed just as performed in blocks 40-44 in FIG. 2 to prepare the transition area 24 of the fiber optic cable 14 for molding. Thereafter, the transition area 24 of the fiber optic cable 14 may be placed into a first cavity 112 of a bottom cover 114 of the multi-cavity mold 110 shown in FIG. 6. The multi-cavity mold 110 also includes a top cover 116 that also contains a cavity (not visible) that aligns with the first cavity 112 when the top cover 116 is secured to the bottom cover 114 to form a cavity having the shape of the molded furcation body 30. The top cover 116 of the multi-cavity mold 110 is secured or closed onto the bottom cover 114 and the first cavity 112 is filled with a first molding material of specified temperature and pressure for a controlled time to produce a molded furcation plug (block 106 in FIG. 5). After a desired specified time has elapsed, the multi-cavity mold 110 is opened and the transition area 24 of the fiber optic cable 14 is removed with the molded furcation plug 12 molded thereto without a strain relief device.

Figure 7A:
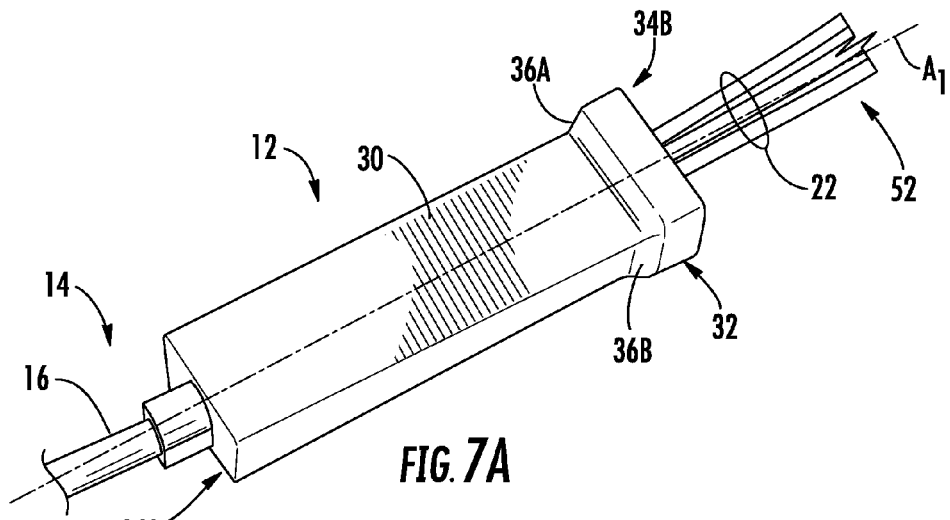
FIG. 7A illustrates another exemplary embodiment of an assembled, molded fiber optic cable furcation assembly without an integral strain relief device.
Figure 7B:
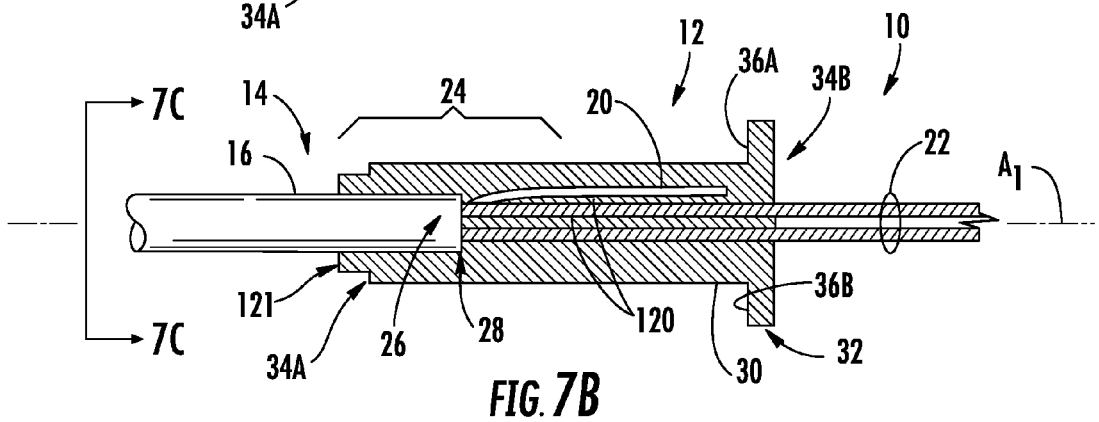
FIG. 7B illustrates a partial cross-sectional view of a cross-section of the molded fiber optic cable furcation assembly of FIG. 7A.
Figure 7C:
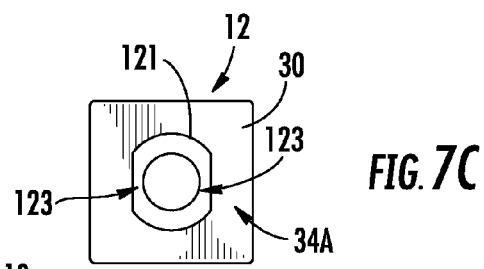
FIG. 7C illustrates an axial end view of the molded fiber optic cable furcation assembly of FIG. 7A.

An explanatory example of a furcation assembly that includes a molded furcation plug that can be molded using the process in FIG. 5 is illustrated in FIGS. 7A and 7B. In this embodiment, the molded furcation plug is the molded furcation plug 12 in the furcation assembly 10 in FIGS. 1A and 1B, but molded using the alternative molding process in FIG. 5 and the multi-cavity mold 110 in FIG. 6. FIG. 7A illustrates a perspective view of the molded furcation plug 12 without the strain relief device 13 provided. FIG. 7B depicts a side view of the molded furcation plug 12 in FIG. 7A. FIG. 7B also shows a molded bond 120 created between the molded furcation plug 12 and the exposed portion of the optical fiber sub-units 22 and the cable strength members 20. As illustrated in FIGS. 6, 7B, and 7C, the first end 34A of the molded furcation body 30 may be created in the first cavity 112 of the multi-cavity mold 110. The first end 34A may include a cylindrical shoulder feature 121 in the molded furcation body 30 to allow for a strain relief device to be pushed onto the cylindrical shoulder feature 121 to provide a friction fit and a communication between a shoulder surface 123 and the end portion of the strain relief device.

Figure 7D:
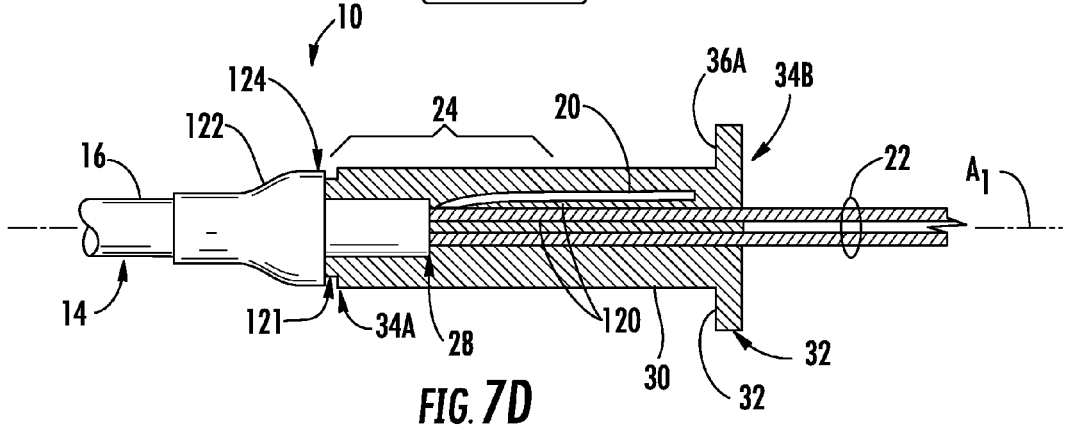
FIG. 7D illustrates a partial cross-section of the molded fiber optic cable furcation assembly of FIG. 7A with a separate strain relief device disposed adjacent to a side of a molded furcation plug.

As illustrated in FIG. 7D, an alternative strain relief device 122 is disposed about the cable jacket 16 prior to molding of the molded furcation plug 12 in the first cavity 112 of the multi-cavity mold 110. In this embodiment, the strain relief device 122 is not molded to the fiber optic cable 14. Instead, after the molded furcation plug 12 is molded, a first end 124 of the strain relief device 122 may be pushed towards the first end 34A of the molded furcation body 30. The strain relief device 122 contains an orifice (not shown) that receives the cylindrical shoulder feature 121 of the molded furcation body 30 to interface and abut the first end 124 of the strain relief device 122 to the shoulder surface 123 of the molded furcation plug 30.

Figure 7E:
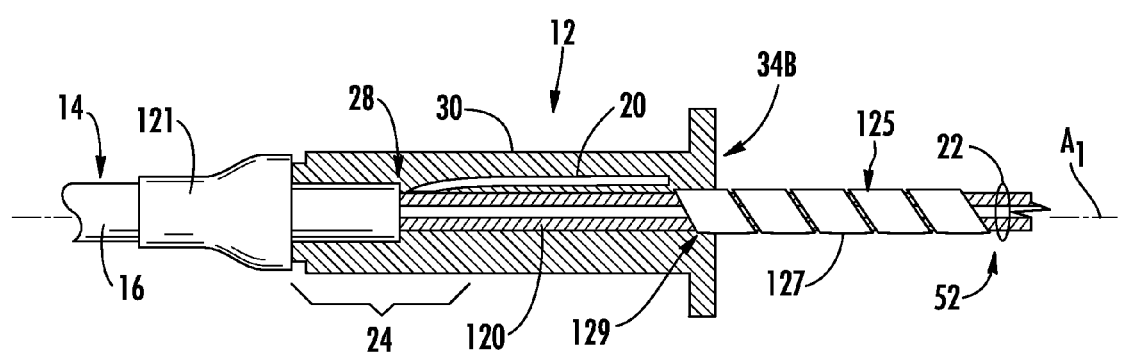
FIG. 7E illustrates a partial cross-section of the molded fiber optic cable furcation assembly of FIG. 7A with a second strain relief device disposed about the optical fibers extending from the furcation plug.

Another optional embodiment of the fiber optic furcation assembly 10 in FIG. 7A includes providing a second strain relief device 125 attached to the second end 34B of the molded furcation body 30. As depicted in FIG. 7E, the second strain relief device 125 may be provided as a tube 127, and more particularly a spiral wound tube. The tube 127 may be disposed over the end portions 52 of the optical fiber sub-units 22 prior to molding the molded furcation plug 12. To secure the tube 127 inside the molded furcation body 30, a portion 129 of the tube 127 is disposed inside the mold used to mold the molded furcation plug 12. The molded bond 120 secures the tube 127 during the molding process to attach the tube 127 to the molded furcation plug 12 to provide strain relief for the optical fiber sub-units 22. The tube 127 may be made from the same material as the strain relief devices disclosed herein, or any other materials desired that provide some flexibility to allow the optical fiber sub-units 22 to be bent.

Figure 8A:
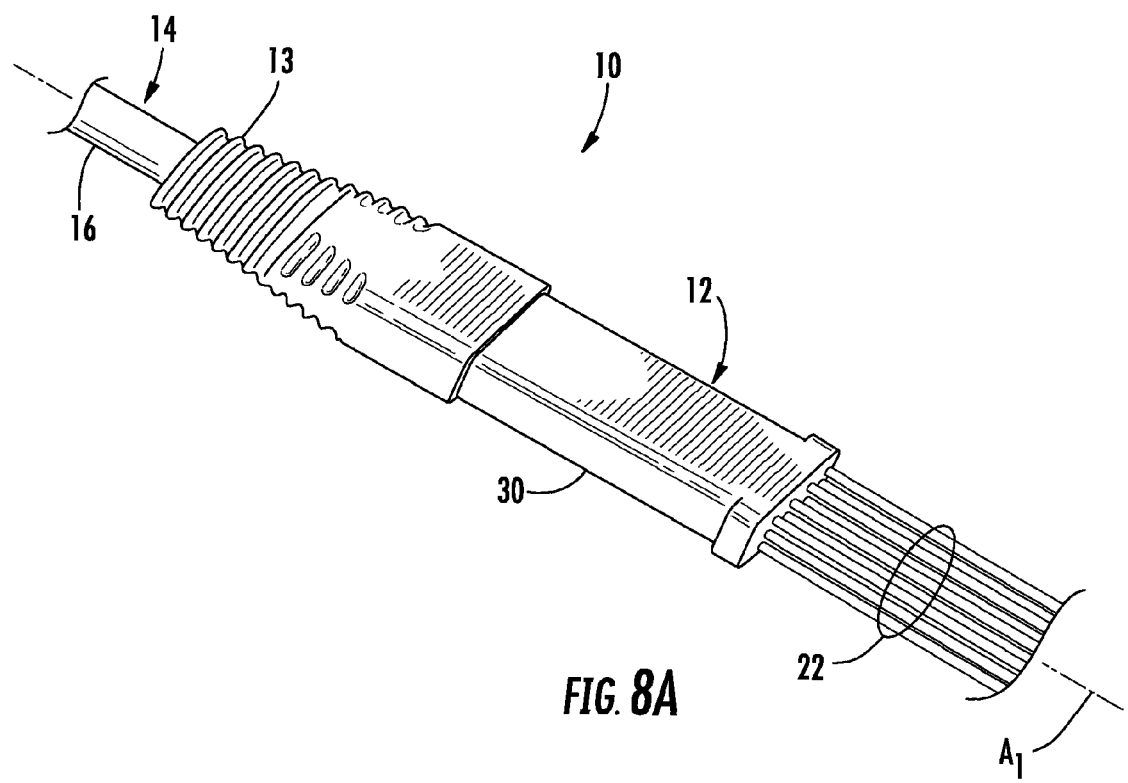
FIG. 8A illustrates an exemplary molded fiber optic cable furcation assembly that may be disposed on a fiber optic cable and formed in the multi-cavity mold.

The multi-cavity mold 110 in FIG. 6 may be used to also mold a strain relief device upon the fiber optic cable 14 in lieu of the strain relief device being provided as a separate component and disposed on the fiber optic cable 14 before the molded furcation plug 12 is molded. This step is represented by block 108 in FIG. 5. In this regard as illustrated in FIG. 8A, the strain relief device 13 in FIGS. 1A and 1B can also be molded about the cable jacket 16 after the molding of the molded furcation plug 12 in the first cavity 112 of the multi-cavity mold 110. In this regard, the molded furcation plug 12 is placed inside a second cavity 118 (FIG. 6) of the multi-cavity mold 110 to mold the strain relief device 13 about the fiber optic cable 14 adjacent to the molded furcation plug 12. The same molding material used to mold the molded furcation plug 12 may be used to mold the strain relief device 13. Alternatively, a different, second molding material may be used to fill the second cavity 118 at a specified temperature and pressure for a controlled time to produce a strain relief device molded upon the molded furcation plug 12 and the cable jacket 16. After molding the strain relief device 13, the furcation assembly 10 is removed from the multi-cavity mold 110 to complete the furcation assembly 10 shown in FIG. 8A, which is also illustrated in FIGS. 1A and 1B and previously described.

Figure 8B:
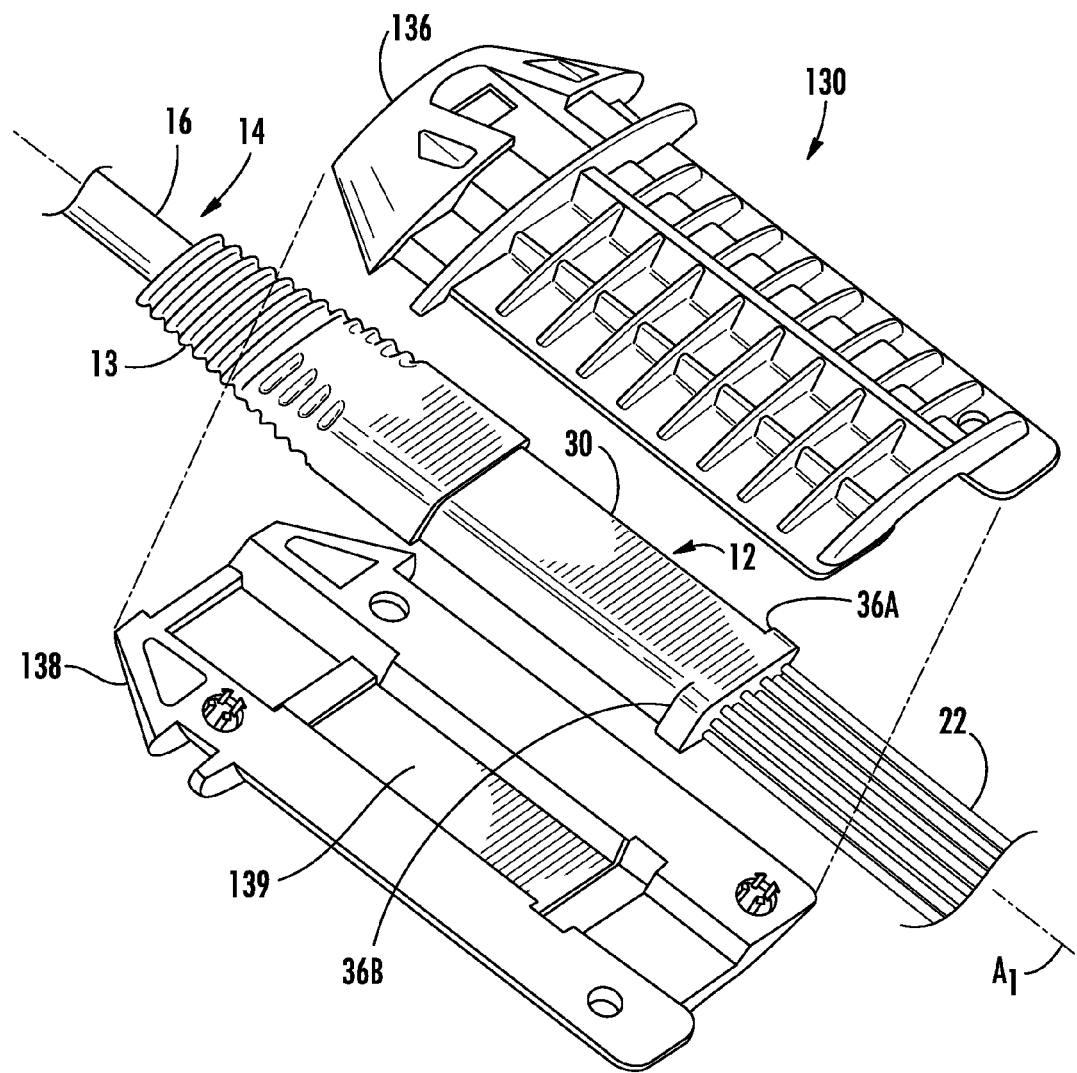
FIG. 8B illustrates a view of a molded fiber optic cable furcation assembly being disposed within a pulling device.

To install the fiber optic cable 14 having furcation assembly 10 such as shown in FIGS. 1A, 1B, and 8A, the molded furcation plug 12 may be disposed in a pulling clamp 130 depicted in FIG. 8B. The pulling clamp 130 with the molded furcation plug 12 disposed therein may be inserted into a pulling bag 132 illustrated in FIGS. 9A and 9B to pull the fiber optic cable 14 to provide a fiber optic pulling assembly 134 illustrated in FIG. 9B. With reference to FIG. 8B, the pulling clamp 130 is comprised of a top clamp member 136 and a bottom clamp member 138. As shown in the bottom clamp member 138, a cavity 139 is provided therein that is designed to tightly receive the molded furcation plug 12. The cavity 139 contains a sub-cavity that is designed to apply a pulling force applied to the pulling clamp 130 to the pulling surfaces 36B in the molded furcation body 30. A complementary cavity (not shown) is provided in the top clamp member 136. When the bottom clamp member 138 and the top clamp member 136 are brought together to secure the molded furcation plug 12 therein, the pulling clamp 130 can be secured inside the pulling bag 132 in FIGS. 9A and 9B to pull the fiber optic cable 14. The pulling clamp 130 may be made of a plastic, a metal, or any rigid material.

Figure 9B:
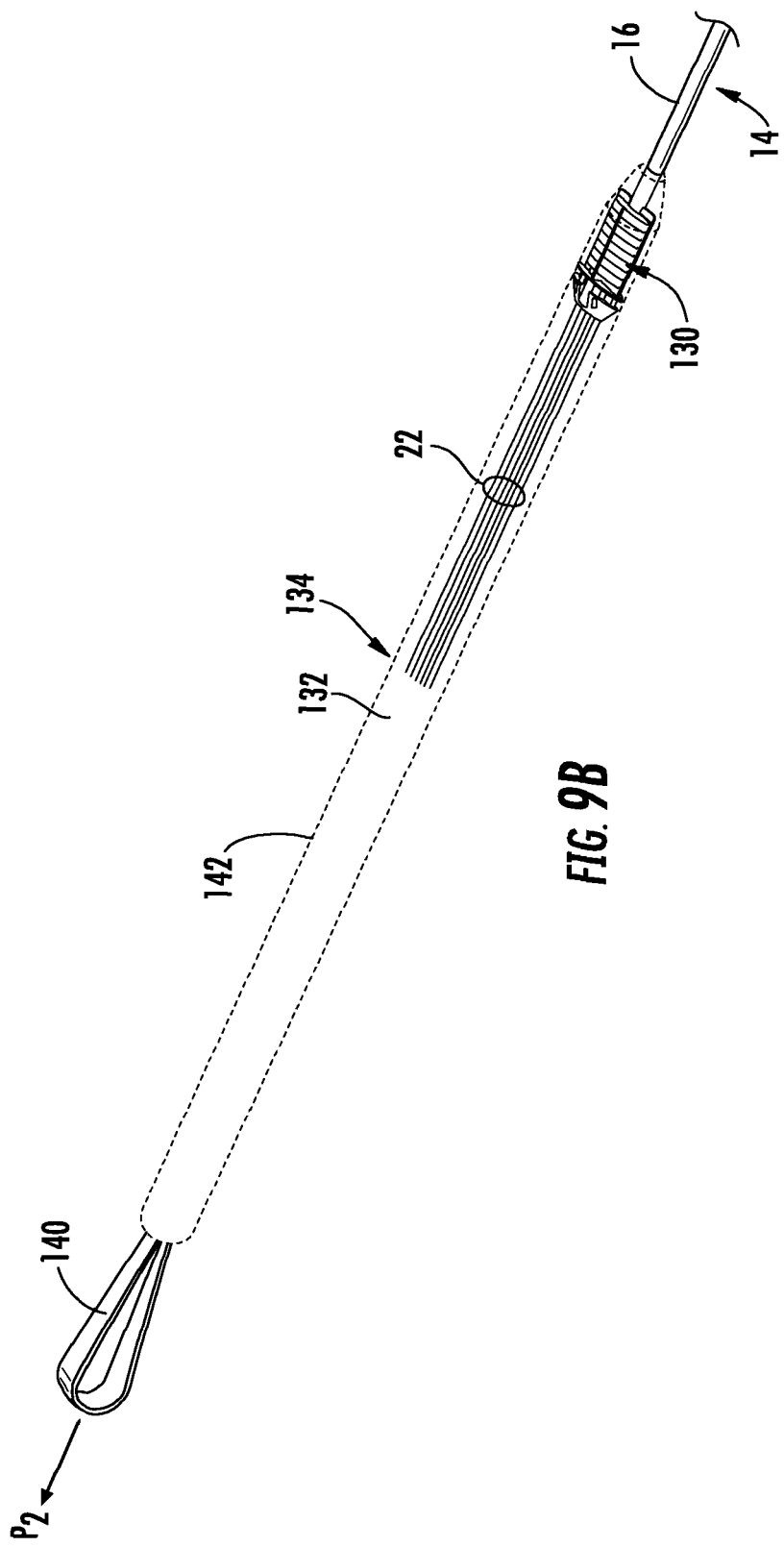
FIG. 9B illustrates the molded fiber optic cable furcation assembly with the pulling device of FIG. 8B securing the molded fiber optic cable furcation assembly of FIG. 8B disposed therein for pulling the fiber optic cable.

In this regard, as shown in FIGS. 9A and 9B, the pulling bag 132 may include a bag loop 140 for transferring a pulling force $P_2$ to a body 142 of the pulling bag 132, which may in turn transfer the pulling force $P_2$ to the pulling clamp 130 via an internal tapered surface 144 of the pulling bag 132. The bag loop 140 is located at a first end 146 of the body 142 of the pulling bag 132. The internal tapered surface 144 is located on a second end 148 of the body 142. The pulling clamp 130 with the furcation assembly 10 disposed therein can be disposed within an interior cavity 150 of the body 142 to secure the fiber optic cable 14 for pulling. The pulling bag 132 may be made of nylon, canvas, or any strong flexible material.

Figure 10A:
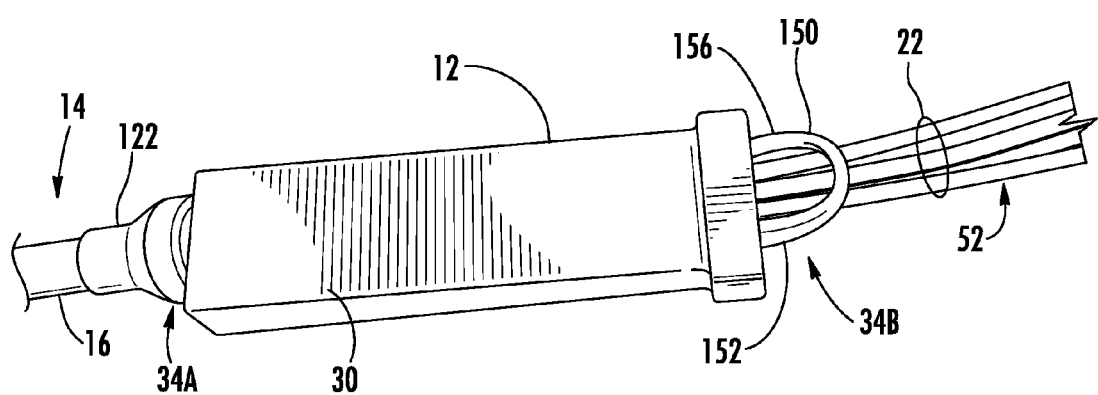
FIG. 10A illustrates another exemplary molded fiber optic cable furcation assembly that additionally includes a strength member pulling loop.
Figure 10B:
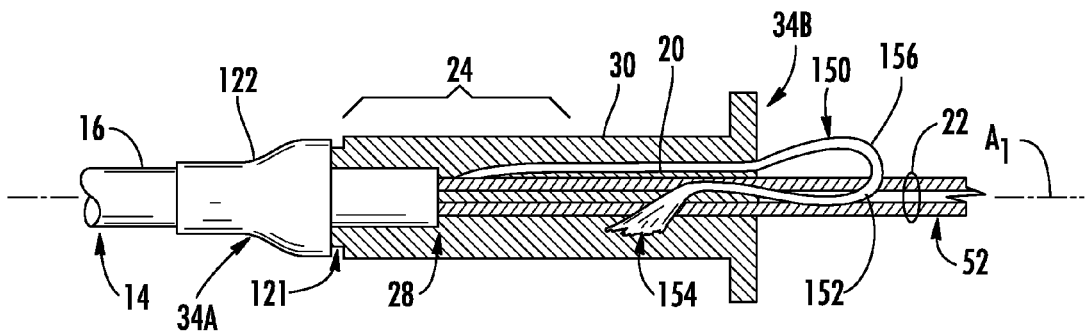
FIG. 10B illustrates a partial cross-sectional view of the molded fiber optic cable furcation assembly in FIG. 10A.

Other embodiments of a molded furcation plug are possible and contemplated. For example, FIGS. 10A and 10B illustrate the molded furcation plug 12 with the alternate strain relief device 122 in FIG. 7D, but include an addition of a strength member pulling loop 150. The strength member pulling loop 150 provides an alternative or additional member that can be pulled to pull the fiber optic cable 14 having the furcation assembly 10 to transfer pulling force to the cable strength member 20. A pulling force may be directly applied to the strength member pulling loop 150. The process to create the strength member pulling loop 150 may be as previously provided, for example, in blocks 40-44 in FIG. 2. However, when the cable strength member 20 is trimmed, the cable strength member 20 is left longer than in previous embodiments described above. This is so that an excess portion 152 of the cable strength member 20 exits from the second end 34B of the molded furcation body 30.

With continuing reference to FIGS. 10A and 10B, the strength member pulling loop 150 may be created by positioning a first end 154 of the excess portion 152 of the cable strength member 20 back within the mold, as illustrated in molded form in FIGS. 10A and 10B. When the molded furcation plug 12 is molded, the molding material disposed in the mold to form the molded furcation plug 12 surrounds and secures the first end 154 of the excess portion 152 of the cable strength members 20 inside the molded furcation plug 12 to form the strength member pulling loop 150. A heat shrink tube 156, as illustrated in FIGS. 10A and 10B, may be disposed around the cable strength member 20 prior to forming the strength member pulling loop 150, if desired.

Figure 11A:
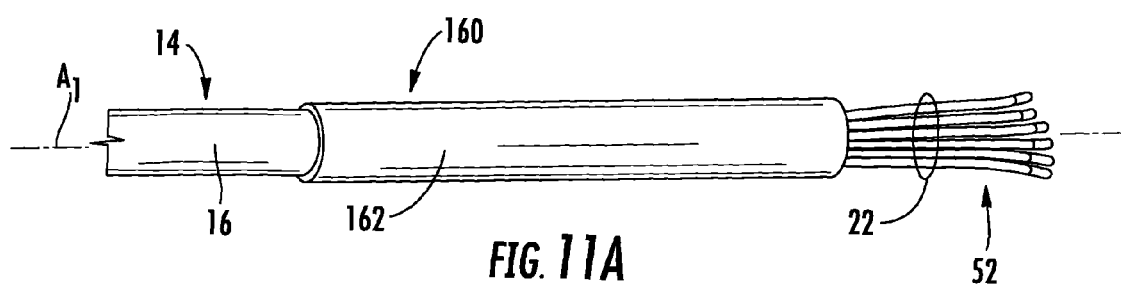
FIG. 11A illustrates another exemplary molded fiber optic cable furcation assembly including a molded furcation plug having a round or elliptical cross-section.
Figure 11B:
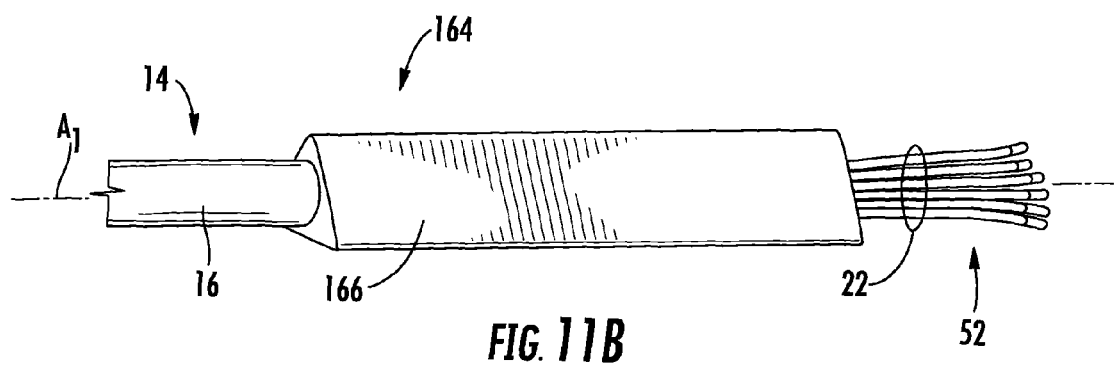
FIG. 11B illustrates another exemplary molded fiber optic cable furcation assembly including a molded furcation plug having a triangular cross-section.

The molded furcation plug 12 described above is molded to provide a rectangular-shaped cross-section furcation body 30. However, other cross-section shapes are possible. For example, FIG. 11A depicts a molded furcation plug 160 that may have a furcation body 162 having a round or an elliptical-shaped cross-section. FIG. 11B depicts a molded furcation plug 164 that may have a furcation body 166 having a triangular-shaped cross-section.

Many modifications and other embodiments of the embodiments set forth herein will come to mind to one skilled in the art to which the embodiments pertain having the benefit of the teachings presented in the foregoing descriptions and the associated drawings. For example, the embodiments herein can be applied to any type of cable and fiber optic cable that includes one or more strength members. The cable may include any other medium, including buffered and unbuffered optical fibers as an example. Any sizes of the features disclosed herein may be provided without limitation.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A method of preparing a fiber optic cable furcation assembly, comprising the steps of:
   providing a fiber optic cable;
   removing a portion of a cable jacket from an end portion of the fiber optic cable to form a transition interface exposing end portions of one or more optical fibers and end portions of one or more cable strength members from the cable jacket thereby forming a transition area in the end portion of the fiber optic cable;
   molding, within a mold, a furcation plug about the transition area; and
   disposing a strain relief device about the cable jacket prior to the molding of the furcation plug; and
   abutting a first end of the strain relief device to a first end of the furcation plug.

2. The method of claim 1, wherein the transition area comprises an end portion of the cable jacket disposed adjacent to a first side of the transition interface, a portion of the exposed end portions of the one or more optical fibers adjacent to a second side of the transition interface, and a portion of the one or more cable strength members adjacent to the second side of the transition interface.

3. The method of claim 1, wherein the step of molding is an overmolding process.

4. The method of claim 1, wherein each of the one or more optical fibers are disposed within a sub-unit jacket within the furcation plug.

5. The method of claim 1, wherein the step of removing a portion of the cable jacket leaves a protective layer on the end portions of one or more optical fibers for the step of molding.

6. The method of claim 1, wherein the step of molding the furcation plug comprises molding the furcation plug to form one or more flat surfaces on the first end of the furcation plug configured to communicate with the first end of the strain relief device.

7. The method of claim 1, wherein the mold comprises a platen mold.

8. The method of claim 1, wherein the step of molding the furcation plug further comprises molding a furcation plug having a rectangular, a round, or an elliptical cross-section orthogonal to a longitudinal axis of the furcation plug.

9. The method of claim 1, wherein the step of molding the furcation plug further comprises molding a furcation plug having a shoulder surface.

10. A method of preparing a fiber optic cable furcation assembly, comprising the steps of:
    providing a fiber optic cable;
    removing a portion of a cable jacket from an end portion of the fiber optic cable to form a transition interface exposing end portions of one or more optical fibers and end portions of one or more cable strength members from the cable jacket thereby forming a transition area in the end portion of the fiber optic cable;

molding, within a mold, a furcation plug about the transition area; and molding a strain relief device upon the cable jacket adjacent to an end of the furcation plug within a second mold, wherein the molding within the mold occurs with a first molding material, and the molding within the second mold occurs with a second molding material of different material from the first molding material.

11. The method of claim 10, wherein the molding the strain relief device comprises molding, within the second mold, the strain relief device upon the cable jacket integrated to an end of the furcation plug.

12. A method of preparing a fiber optic cable furcation assembly, comprising the steps of:

providing a fiber optic cable;

removing a portion of a cable jacket from an end portion of the fiber optic cable to form a transition interface exposing end portions of one or more optical fibers and end portions of one or more cable strength members from the cable jacket thereby forming a transition area in the end portion of the fiber optic cable; and molding, within a mold, a furcation plug about the transition area;

wherein the method further comprises the step of twisting the end portions of the one or more cable strength members before the molding.

13. The method of claim 12, further comprising the step of molding a strain relief device over the cable jacket adjacent to the furcation plug.

14. The method of claim 13, wherein the furcation plug and the strain relief device are molded to provide the strain relief device integrated with the furcation plug.

15. A method of preparing a fiber optic cable furcation assembly, comprising the steps of:

providing a fiber optic cable;

removing a portion of a cable jacket from an end portion of the fiber optic cable to form a transition interface exposing end portions of one or more optical fibers and end portions of one or more cable strength members from the cable jacket thereby forming a transition area in the end portion of the fiber optic cable;

molding, within a mold, a furcation plug about the transition area;

wherein the method further includes the steps of:

disposing the one or more optical fibers inside a strain relief tube;

disposing a portion of the strain relief tube in the transition area from the second end of the furcation plug prior to the molding the furcation plug; and molding the furcation plug upon the portion of the strain relief tube.

16. A fiber optic cable assembly, comprising:

a fiber optic cable including one or more optical fibers and one or more cable strength members disposed within a cable jacket, end portions of the one or more optical fibers and end portions of the one or more cable strength members both exposed from an end portion of the cable jacket at a transition interface to form a transition area in an end portion of the fiber optic cable;

a furcation plug molded about the transition area; and a pulling loop comprising ends of the end portions of the one or more cable strength members disposed through the furcation plug and looped back inside the furcation plug.

17. The fiber optic cable assembly of claim 16, wherein the transition area comprises an end portion of the cable jacket disposed adjacent to a first side of the transition interface, a portion of the exposed end portions of the one or more optical fibers adjacent to a second side of the transition interface, and a portion of the one or more strength members adjacent to the second side of the transition interface.

18. The fiber optic cable assembly of claim 16, further comprising one or more sub-unit jackets disposed in the fiber optic cable, each of the one or more optical fibers disposed within a sub-unit jacket among the one or more sub-unit jackets.

19. The fiber optic cable assembly of claim 16, wherein the furcation plug further comprises a furcation body comprising a tapered cross-section side adjacent to the transition area.

20. The fiber optic cable assembly of claim 16, further comprising a strain relief device disposed upon the cable jacket and including a first end configured to be abutted to an end of the furcation plug.

21. The fiber optic cable assembly of claim 20, further comprising one or more flat surfaces disposed on a first end of the furcation plug disposed adjacent to the first end of the strain relief device.

22. The fiber optic cable assembly of claim 16, further comprising a strain relief tube receiving the one or more optical fibers, a portion of the strain relief tube disposed in an end of the furcation plug and molded into the furcation plug.

* * * * *